(12) United States Patent
Farmer et al.

(10) Patent No.: US 7,021,415 B2
(45) Date of Patent: Apr. 4, 2006

(54) ELECTRO-MECHANICAL ACTUATOR FOR AN ELECTRICALLY ACTUATED PARKING BRAKE

(75) Inventors: William Farmer, Acton, MA (US); Gary Kinnear, Weymouth, MA (US); Thomas P. Schregardus, Somerville, MA (US); Yuly Yanishevsky, Marblehead, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/712,764

(22) Filed: Nov. 13, 2003

(65) Prior Publication Data

US 2004/0178028 A1    Sep. 16, 2004

Related U.S. Application Data

(63) Continuation-in-part of application No. 10/061,940, filed on Feb. 1, 2002, now Pat. No. 6,736,233.

(60) Provisional application No. 60/467,993, filed on May 5, 2003, provisional application No. 60/426,044, filed on Nov. 13, 2002.

(51) Int. Cl.
*B60T 7/02*    (2006.01)

(52) U.S. Cl. .................................... 180/275; 188/162
(58) Field of Classification Search ............... 180/275; 188/72.1, 158, 162
See application file for complete search history.

(56) References Cited

U.S. PATENT DOCUMENTS

| 5,605,072 | A  |   | 2/1997  | Schmidt et al. ............ 74/435 |
| 5,986,369 | A  | * | 11/1999 | Hanley et al. ............. 310/77 |
| 6,189,409 | B1 |   | 2/2001  | Neag et al. ............... 74/512 |
| 6,397,981 | B1 | * | 6/2002  | Tamasho et al. .......... 188/71.9 |
| 6,412,610 | B1 | * | 7/2002  | Drennen et al. ........... 188/156 |

FOREIGN PATENT DOCUMENTS

| DE | 3331597 | 3/1985  | .............. 74/513 |
| FR | 1283644 | 12/1961 | .............. 74/84 |
| GB | 916106  | 1/1963  |                      |
| GB | 2184487 | 6/1987  | .............. 74/513 |
| JP | 2-116911| 5/1990  | .............. 74/594.3|

OTHER PUBLICATIONS

Written Opinion dated Mar. 4, 2005, 6 Pages.
Notification of International Preliminary Report on Patentability dated May 18, 2005, 6 Pages.

* cited by examiner

*Primary Examiner*—Eric Culbreth
(74) *Attorney, Agent, or Firm*—Grossman, Tucker, Perreault & Pfleger, PLLC (57) ABSTRACT

An electrically actuated parking brake system and actuator therefor. The actuator includes a motor having a drive shaft, and a gear train coupled to the drive shaft, wherein the gear train provides at least one mechanical output from the actuator. The gear train may include a drive gear coupled to the drive shaft, a driven gear coupled to the drive gear, and a planetary gear set coupled to the driven gear. Various configurations are provided for isolating actuator components for controlling audible noise, including sub-frame isolation configurations, motor isolation configurations, and gear train isolation configurations.

25 Claims, 6 Drawing Sheets

ELECTRO-MECHANICAL ACTUATOR FOR AN ELECTRICALLY ACTUATED PARKING BRAKE

CROSS-REFERENCE TO RELATED APPLICATIONS

This application is a continuation-in-part of U.S. patent application Ser. No. 10/061,940, filed Feb. 1, 2002, now U.S. Pat. No. 6,736,233, and claims the benefit of U.S. provisional patent application Ser. No. 60/426,044, filed Nov. 13, 2002 and also claims the benefit of U.S. provisional patent application Ser. No. 60/467,993, filed May 5, 2003, the entire disclosure of which applications are incorporated herein by reference.

FIELD OF THE INVENTION

The present invention relates generally to electrically actuated parking brake systems for passenger vehicles, and, in particular, to an actuator assembly for controlling the parking brake function within passenger vehicles.

BACKGROUND OF THE INVENTION

Electric parking brake systems have been provided in vehicles to allow the application and release of the parking brake via electrical signal, eliminating the current mechanical connection, i.e. cable and lever. These systems typically include an electro-mechanical actuator connected to the brake caliper either by a cable, as in the drum in head, or directly attached to the brake caliper. The actuator converts electrical power to rotational mechanical output power for moving the cable or drive screw and applying the brakes.

In addition, audible noise is a significant feature differentiating actuators in parking brake systems and many other actuation applications. In some applications, a loud system is desirable to alert an operator that the actuator is being cycled. In other applications, a quiet system is desirable to keep in-cabin noise to a minimum.

There is therefore a need for an efficient, reliable and cost-effective actuator design for a vehicle parking brake system that overcomes the deficiencies of the prior art. There is a further need for a method of tuning the actuator for audible noise performance.

SUMMARY OF THE INVENTION

According to one aspect of the invention, there is provided an actuator including a motor having a drive shaft, and a gear train coupled to the drive shaft, via either a flexible belt or a continuation of the gear train wherein the gear train provides a mechanical output from the actuator. The gear train may be provided in a variety of configurations, and may include a worm gear and worm wheel configuration for reducing audible noise.

According to another aspect of the invention, there is provided an actuator including an isolator having an effective spring constant and damping constant. The isolator is coupled to at least one component, e.g. a motor, of the actuator for isolating the component from a remainder of the actuator to provide a desired affect to audible noise. Tailoring of the spring and damping constants of the isolator allows audible noise tuning. According to another aspect of the invention, an isolator may be coupled to a sub-frame for isolating the sub-frame from a housing of the actuator, wherein the sub-frame is configured to enclose a plurality of components of the actuator.

According to yet another aspect of the invention, there is provided an actuator including a component isolator having an effective first spring constant and first damping constant, the component isolator coupled to at least one component of the actuator for isolating the component from a remainder of the actuator; and a sub-frame isolator having an effective second spring constant and second damping constant, the sub-frame isolator coupling a sub-frame to a housing of the actuator. The sub-frame may enclose at least a portion of at least one component.

According to still another aspect, there is provided an actuator having a central mounting plate. The central mounting plate may allow for tight dimensional control of all of the component mounting features. The central mounting plate may further enable the construction of the actuator components as a separate subassembly that can be tested before insertion into the housing. The central mounting plate may be provided as a sub-frame. Accordingly, the central mounting plate may include an isolator having an effective spring constant and damping constant, wherein the isolator couples the mounting plate to an actuator housing.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
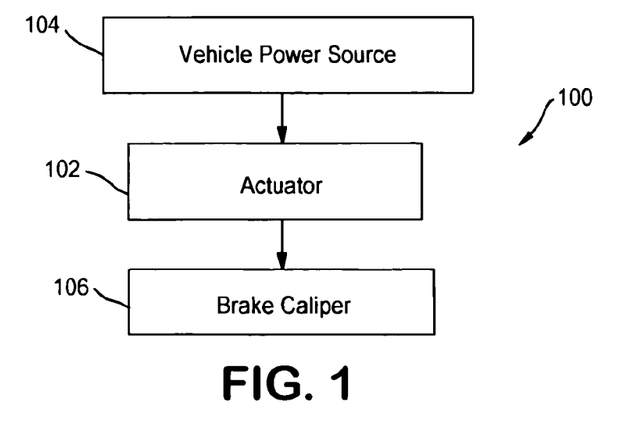
FIG. 1 is a simplified block diagram of an exemplary electronic parking brake actuator (EPBA) system consistent with the invention.

FIG. 1 is a simplified block diagram of an exemplary electronic parking brake actuator (EPBA) system 100 consistent with the present invention. Advantageously, the EPBA may include an actuator 102 that receives electrical power from a vehicle power source 104, e.g., a vehicle battery. The actuator may convert electrical energy to mechanical energy to drive a variety of devices. In the illustrated exemplary parking brake actuator system 100, the actuator 102 may drive a brake caliper 106 associated, for example, with an emergency brake system.

Those skilled in the art will recognize a variety of ways that the actuator 102 may be coupled to a brake caliper 106 for applying the brakes. For example, the actuator 102 may be coupled to the brake caliper 106 via a push-rod for actuating the brake. Similarly, a cam mechanism may produce braking action at the brake caliper 106 in response to the rotational output of the actuator 102. Alternatively, the actuator 102 may be adapted to provide a linear output that may be coupled to the brake caliper 106.

Figure 3:
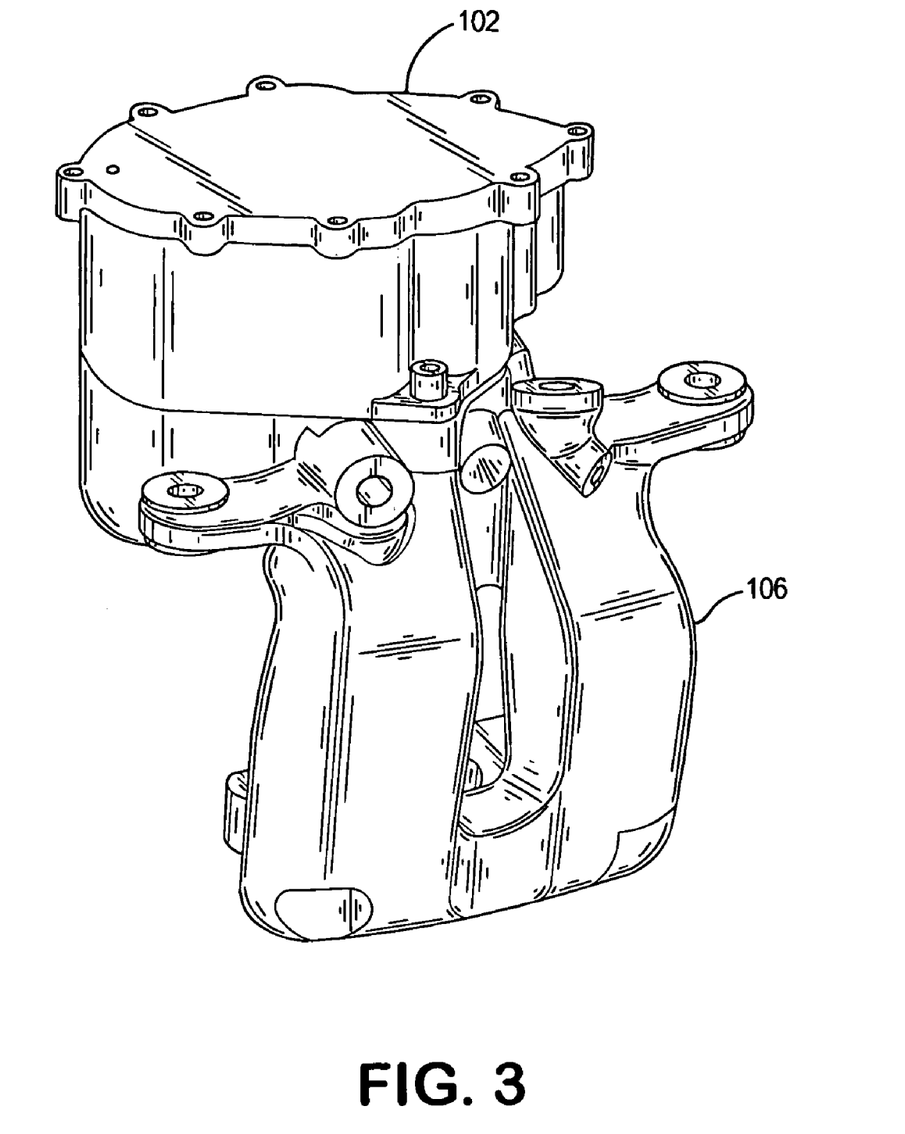
FIG. 3 is a top perspective view of an exemplary EPBA consistent with the invention mounted on a brake caliper.

In the illustrated embodiment of FIG. 3, the actuator 102 may be mounted directly to a brake caliper 106. Those having skill in the art, however, will recognize that the actuator 102 may be mounted to any suitable portion of a vehicle, including frame, body, and trim components. It will be understood that depending upon the particular mounting location and techniques, i.e. hard mounted versus soft mounting through an elastic member, operation of the actuator may cause a variety of audible noises. As later detailed herein, an actuator consistent with the present invention may be configured for tailoring the audible noise of the actuator to a desired level.

The emergency brake caliper 106 may thus be selectively engaged from, e.g., a vehicle cockpit by a vehicle driver. The emergency brake may be engaged by the manual operation of a switch, in a similar manner as the manual engagement of a hand brake or pedal operated emergency brake. The system 100 of the present invention may also be engaged in response to inputs from various sensors. For example, a sensor may be provided on an automatic transmission to engage the emergency brake when the "park" position is selected. Consistent with another embodiment, a sensor may be provided to detect motion of the vehicle when the engine is turned off. The emergency brake system may be configured to actuate the brake caliper 106 if rolling motion of the vehicle is detected while the engine is turned off.

Figure 2:
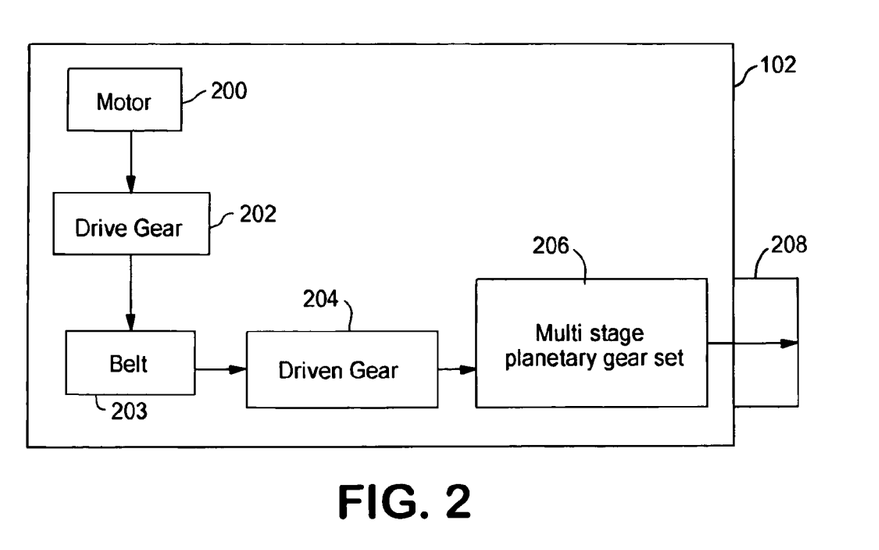
FIG. 2 is a simplified block diagram of the internal components of the actuator of FIG. 1.

Turning to FIG. 2, a simplified block diagram of the internal components of an actuator 102 consistent with the present invention is illustrated. These components include a motor 200 (or a plurality of motors) for converting electrical energy from the power source to mechanical energy. The output shaft of the motor 200 may be coupled to a drive gear 202, e.g., a pinion gear, a worm gear, or the like. The drive gear 202 may be coupled to a driven gear 204, e.g., a spur gear, a worm wheel, or the like. The driven gear 204 may be in meshing engagement with a single or multiple stage planetary gear set 206. The output shaft 208 may then provide one mechanical output through an associated output port. Advantageously, the gear train may have an overall efficiency in the range of 60% and greater. However, lower efficiency gear trains may also be suitable for various applications.

In the embodiment of the actuator 102 shown in FIG. 2, the drive gear 202, may be coupled to the driven gear 204 via a drive belt 203, for example a toothed drive belt such as a synchronous timing belt. Accordingly, the drive gear 202 may be a drive pulley, and similarly the driven gear 204 may be a driven pulley. The driven pulley 204 may be in meshing engagement with the single or multiple stage planetary gear set 206. The output shaft 208 may then provide one mechanical output through the associated output port. However, the drive gear 202 may alternatively be in meshing engagement with the driven gear 204.

An electrical energy source (not shown), e.g. the vehicle battery, may be connected to the actuator 102 along with other control inputs, via connector pins in an integral connector assembly, which may be formed on a cover portion of the actuator housing. The connector pins may provide electrical connections to a printed circuit board (PCB), which may include motor control and position sensing electronics for driving the motor. A bottom portion of the housing may include integral locating features for the actuator components as well as mechanical attachment points for securing the actuator to a fixed location.

Figure 4:
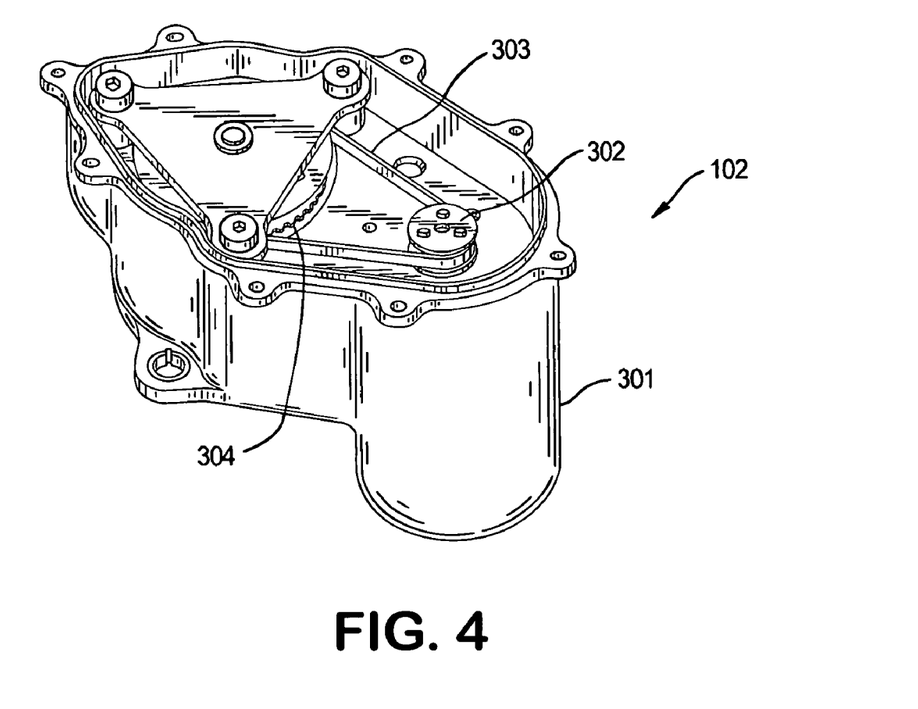
FIG. 4 is a perspective view of an exemplary actuator consistent with the invention with a top housing cover removed.
Figure 5:
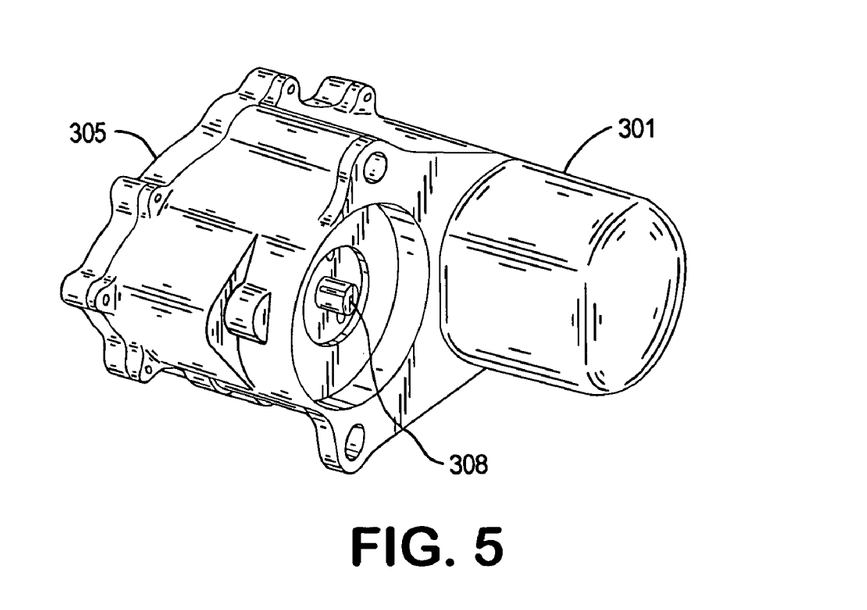
FIG. 5 is a perspective view of the actuator shown in FIG. 3 with the top housing cover installed.

Referring next to FIGS. 4 through 7, one exemplary actuator 102 consistent with the present invention is illustrated in various views. FIG. 4 is a top-end view of the actuator 102. As shown, the actuator 102 may include an actuator housing 301 having a top cover 305, shown removed in FIG. 4. With the housing top portion, or cover, 305 removed, a drive pulley 302 may be seen coupled to a driven pulley 304 via a drive belt 303. The motor and planetary gear set, not visible in FIGS. 4 and 5, may be contained in housing 301. As shown in FIG. 5, an output 308 of the actuator 102 may be provided extending from the bottom-end of the actuator housing 301 adjacent the motor. Those having skill in the art will appreciate that the output 308 may be provided at other locations on the housing 301 by utilizing different gear arrangements that will be readily understood.

Figure 6:
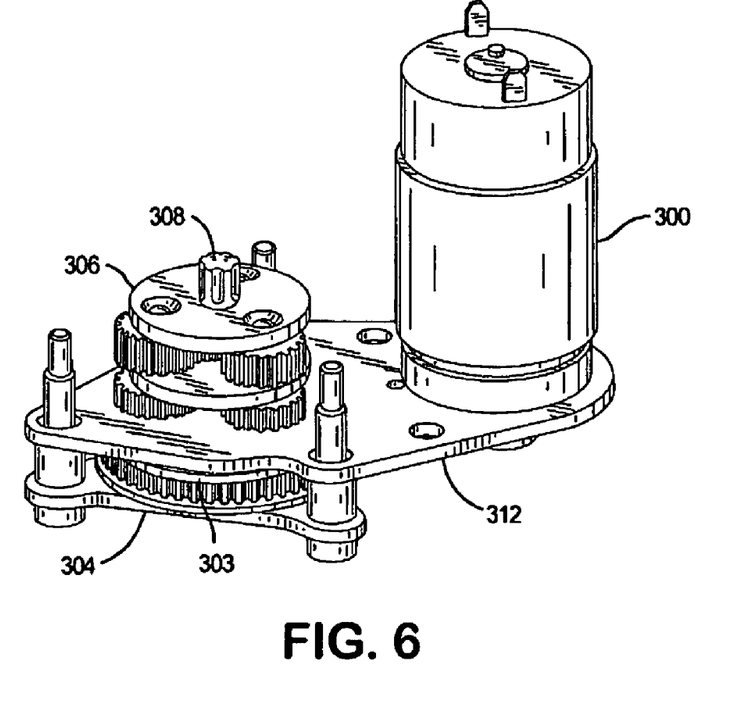
FIG. 6 is a perspective view of another exemplary actuator consistent with the invention with the housing removed.
Figure 7:
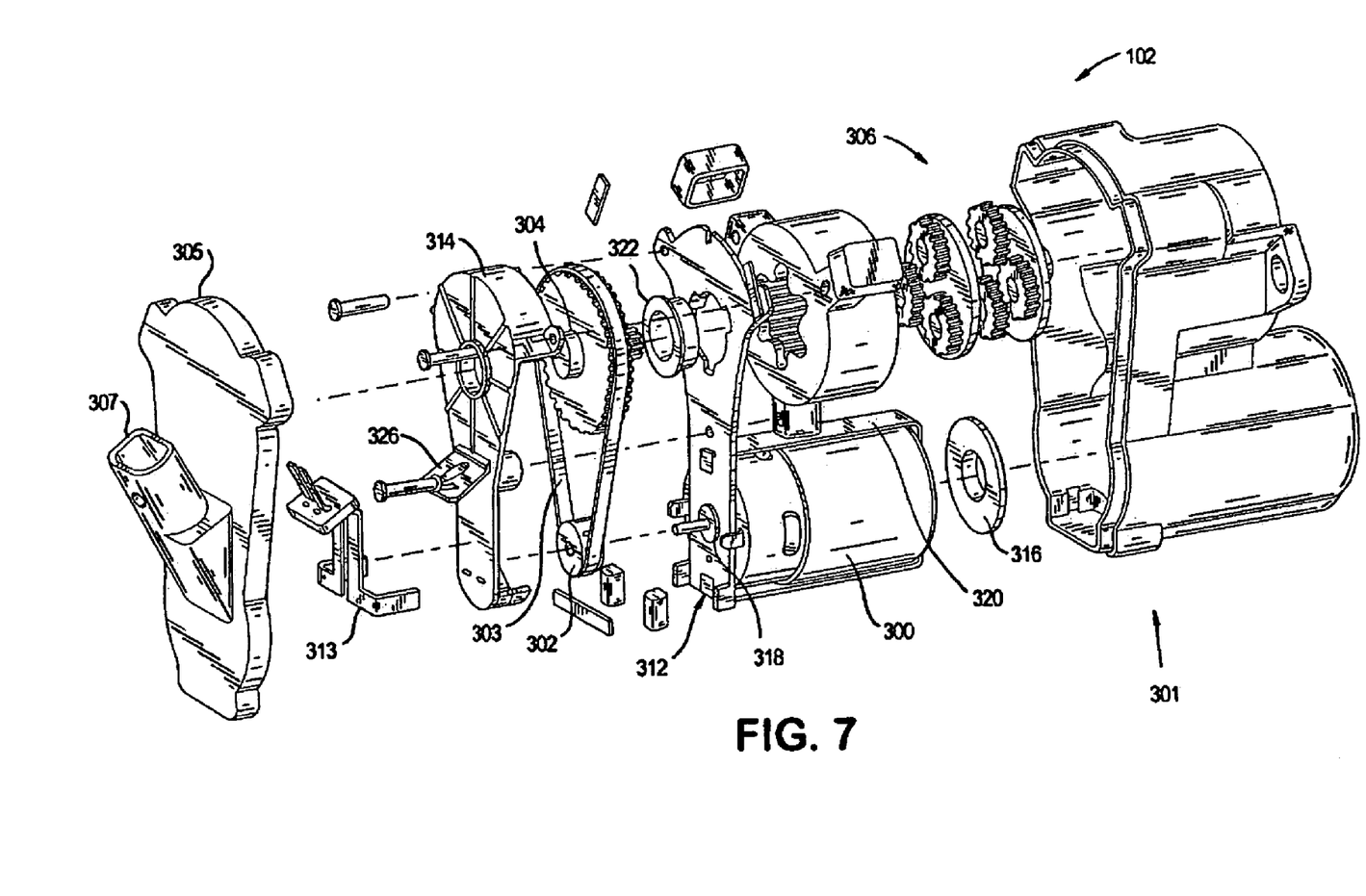
FIG. 7 is an exploded view of an exemplary actuator consistent with the invention.

Turning to FIGS. 6 and 7, the mechanical assembly of the exemplary actuator 102 of FIGS. 4 and 5 is most clearly shown. Advantageously, the illustrated exemplary embodiment 102 provides an actuator output in a compact configuration useful in the limited space available in automotive applications, such as in an electrically actuated parking brake. As previously described, the actuator 102 may include a motor 300 mounted to a sub-frame 312, e.g. a mid plate. As shown in the preceding figures, the motor shaft may carry a drive pulley 302, disposed on the opposed side of the sub-frame 312 that drives a driven pulley 304 via a drive belt 303. In the illustrated embodiment, the driven pulley 304 in turn drives a double planetary gear set 306. The driven pulley 304 may drive the planetary gear set 306 via a shaft extending through the sub-frame 312 and coupled to the a gear in meshing engagement with the planetary gear set 306. Alternatively, the driven pulley 304 may be configured as a compound gear. That is, the driven pulley 304 may include a pulley portion engaged with the drive belt 303 and a geared portion that extends through the sub-frame and is in meshing engagement with the planetary gear set 306.

As mentioned, the motor 300 and drive train of the actuator 102 may be mounted on the sub-frame 312. This configuration may facilitate assembly of the actuator 102. By mounting the components to the sub-frame 312 outside of the actuator housing 301 much greater access is provided to the components and ease of handling is improved. Furthermore, once the components have been mounted to the sub-frame 312, as shown in FIG. 6, performance of the actuator 102 may be tested prior to final assembly. Accordingly, detected problems may be resolved at an earlier stage in the assembly process.

With particular reference to FIG. 7, the actuator 102 may include a housing top portion 305 that may be positioned on the actuator housing 301, thereby substantially enclosing the actuator. The top portion 305 may include a connector fitting 307 for receiving terminals 313 that are coupled to the motor 300, e.g. for providing power to the motor and/or control signals. The connector fitting 307 may be formed as a protruding feature, as illustrated. Alternatively, the top portion 305 may merely be formed having openings to accept wiring therethrough.

The illustrated exemplary actuator 102 also includes a sub-frame top portion 314 that may be disposed on the sub-frame, or mid-plate, 312 and may cover at least a portion of the drive gear 302, driven gear 304 and drive belt 303. Various means of securing the sub-frame top portion 314 to the sub-frame 312 will be understood by those having skill in the art.

In one exemplary embodiment, the terminals 313 may be secured to the top portion of the sub-frame 314, thereby orienting the terminals 313 to be received in the connector fitting 307 as well as orienting the terminals 313 to be coupled to the motor 300. Additionally, mounting the terminals to the top portion 314 may allow the terminals to better resist push-pull forces. Consistent with this embodiment wherein the terminals are secured to the top portion of the sub-frame 314, it may be desirable to form the top portion 314 from a polymer material to effectively retain and insulate the terminals.

Those having skill in the art will appreciate that numerous different materials may suitably be used for the various components of the actuator 102. For example, the housing 301 and the top portion 305 may be formed from a polymeric material. Increased strength and durability may further be achieved by using a reinforced polymeric material, such as glass filled Nylon. Similarly, the drive and driven pulley may be formed from a polymeric material, including a reinforced polymeric material such as glass filled Nylon.

The planetary gear set, including the planet gears, carriers, and the ring gear may also be formed from a variety of different materials, including both polymeric materials and metallic materials. Advantageously, the planetary gear assembly may be formed from powder metal, thereby providing strong components. Gear sets formed from powder metal may be further strengthened by heat treating.

Figure 8:
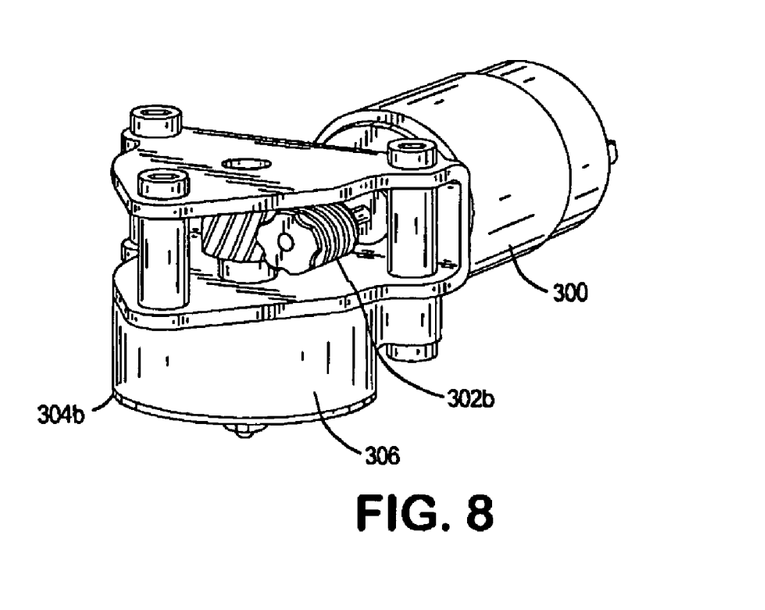
FIG. 8 is a perspective view of an actuator consistent with the invention having a worm gear and worm wheel for noise reduction benefits.

Consistent with one aspect of the invention herein, it may be desirable to control the audible noise of the electro-mechanical actuator. Audible noise has become a significant attribute of electro-mechanically actuated systems in passenger vehicles. Typically it is desirable to reduce the audible noise in the cabin of a passenger vehicle. One exemplary maimer of reducing audible noise consistent with the invention is by gear train selection. Referring to FIG. 8, by replacing the motor pinion drive gear and driven gear with a worm gear 302b and worm wheel 304b, as illustrated, a significant reduction in audible noise can be achieved.

Figure 9:
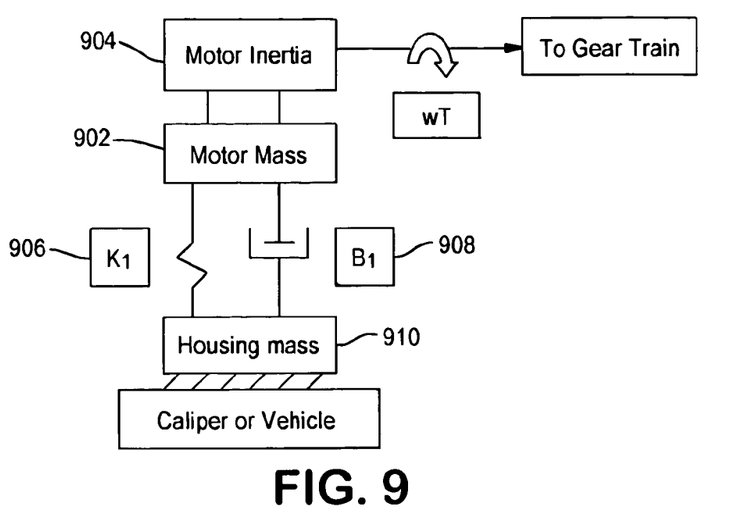
FIG. 9 is a block diagram illustrating the benefits of isolating a motor in an actuator consistent with the present invention.

Another method of reducing audible noise consistent with the invention includes isolation of various components and sub-components of an actuator. FIG. 9 is a block diagram illustrating motor isolation consistent with the invention. A motor having a certain mass 902 and energy, i.e. generating motor inertia 904, may be coupled to an isolator, e.g., a pair of isolation bushings on either side of the motor. The isolator has an effective spring constant 906 and damping constant 908, both of which may be varied depending on the type of material and geometry chosen for the isolator. The isolator thus mechanically isolates the motor from the mass of the actuator housing 910, thereby reducing air born audible noise associated with motor vibration.

Referring back to FIG. 7, the illustrated exemplary embodiment includes a motor isolation assembly in an actuator 102 consistent with the present invention. In the illustrated embodiment, first and second housing portions are configured to define a motor isolation cavity. A first portion of the cavity is defined by the main housing 301, and a cover to the cavity is provided by the sub-frame 312, which may cover the top of the isolation cavity when installed in the housing 301. Accordingly, in the assembled actuator 102, the motor 300 may be disposed in the isolation cavity, which may be separate from the remainder of the actuator 102.

In addition to receiving the motor in an isolation cavity, a first isolation bushing 316 and a second isolation busing 318 may be provided at associated ends of the motor 300. The isolation bushings 316, 318 and the mating main housing 301 and sub-frame 312 portions may not only isolate the motor 300 in the motor cavity but also prevent the transmission of vibrations from the motor 300 to the remainder of actuator components, thereby reducing associated audible noise. Advantageously, the audible noise may be adjusted by selection of the isolation bushing material to provide appropriate spring and damping constants.

Figure 10:
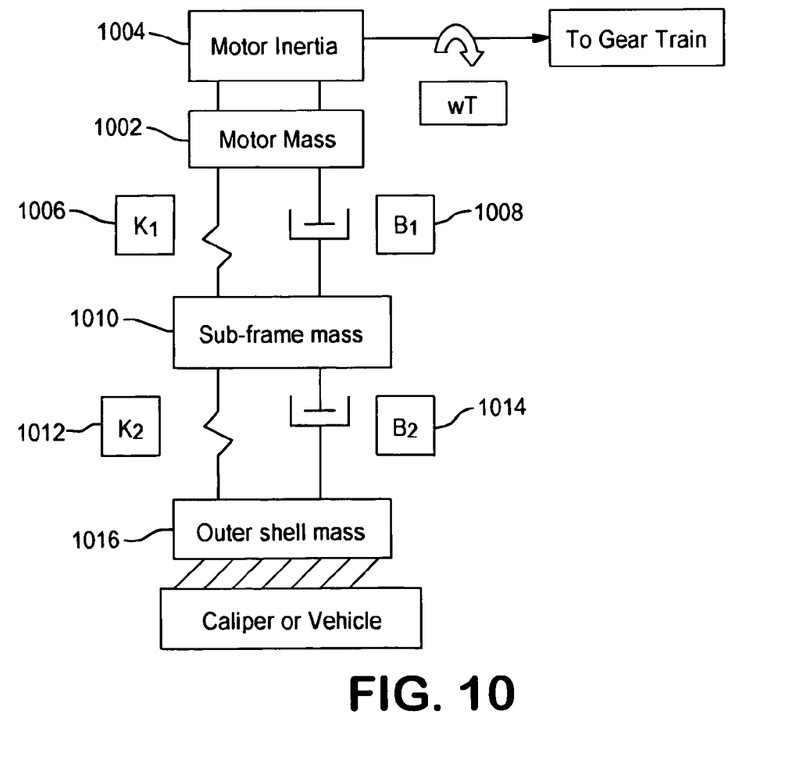
FIG. 10 is a block diagram illustrating the benefits of isolating a motor and a sub-frame within an actuator consistent with the present invention.

In a further embodiment, internal actuator components may be housed in a sub-frame. The sub-frame may also be isolated from the actuator housing for additional noise reduction benefits. FIG. 10 is a block diagram illustrating an exemplary sub-frame configuration consistent with the invention. Again a motor having a certain mass 1002 and energy, i.e. providing motor inertia 1004, may be coupled to a motor isolator or isolators, e.g., pair of isolation bushing on either side of the motor. The motor isolator has an effective spring constant 1006 and damping constant 1008, both of which may be varied depending on the type of material and geometry chosen for the motor isolator.

In this instance, the motor is isolated from the mass of the sub-frame 1010. The mass of the sub-frame may be chosen to minimize transfer of vibration by adjusting the volume and material density. In turn, the sub-frame is coupled to the mass of the outer shell 1016 of an actuator consistent with the invention. Similar to the motor isolator, the sub-frame isolator or isolators have an effective spring constant 1012 and damping constant 1014 isolating the sub-frame 1010 from the outer shell 1016 of the actuator. The effective spring constant 1012 and damping constant 1014 for the sub-frame isolator can be tailored by selection of an appropriate material and geometry for the isolator.

In the exploded view shown in FIG. 7, the exemplary actuator 102 includes both a motor 300 and a sub-frame isolation assembly, which includes the sub-frame lower portion 312 and the sub-frame top portion 314. Mating of the sub-frame top portion 314 and lower 312 portions of the sub-frame may at least partially enclose the actuator drive gear 302, driven gear 304 and drive belt 303 components, as well as isolate the motor 300 in a separate isolation cavity defined by the housing 301 and the sub-frame 312. As previously discussed, first and second isolation bushings 316, 318 may also reduce the transmission of vibrations from the motor 300. Again, the bushings 316, 318 may be formed from materials chosen to provide desired spring and damping constants for reducing noise. In addition to the bushings 316, 318, the motor may also be retained to the sub-frame 312 by straps 320. As with the bushings, the straps 320 may be formed from a material chosen to provide a desired spring constant and damping constant.

The sub-frame may be constructed from a variety of materials to assist with audible noise reduction. For instance, the sub-frame top portion 314 may be a low-density material, e.g., a plastic, and the sub-frame lower portion 312 may be a higher density material, e.g., metal such as steel.

Consistent with the aspect of a multi-tiered isolation scheme, the motor 300 may be contained in a motor isolation cavity defined by the main housing 301. The motor isolation cavity may be completed by the sub-frame 312 disposed over the opening of the isolation cavity defined by the housing 301. Additionally, the planetary gear set 306 may also be contained in an isolation cavity defined by the main housing 301. Similar to the motor isolation scheme, the planetary gear set 306 may be isolated from the sub-frame 312 by a bushing 322. The planetary gear set isolation bushing 322 may be formed from a material chosen to provide a desired spring constant and damping constant.

A main portion 301 and a top portion 305 of the actuator housing mate to enclose the sub-frame 312. In the embodiment, the sub-frame top portion 314 is isolated from the actuator housing top portion 305 by an isolator 326. In addition, the sub-frame lower portion 312 is isolated from the main housing portion 301 of the actuator by a plurality of isolators. The isolators may include central openings for accepting associated protrusions on the sub-frame lower portion 312 which extend into corresponding openings in the main housing portion 301 of the actuator. The isolators or grommets may, for example, be elastomeric for achieving a desired spring and damping constant.

The motor may thus be isolated from the sub-frame by bushings, and all actuator components, including the motor, may be isolated from the outer actuator housing by the sub-frame, which may be isolated from the outer actuator housing by isolators. Advantageously, when the actuator housing is affixed to another system, such as a brake caliper or vehicle body, the actuator components are mechanically isolated in the sub-frame. This provides a benefit to vehicle manufacturers as mechanical vibration transmission to the mating assembly is minimized. Also, adjustment of the spring and damping constants associated with the bushings and isolators, and adjustment of the sub-frame and actuator housing materials, allows for tuning of the audible noise associated with the actuator for a particular application.

In an alternative embodiment, the sub-frame may include a housing that at least partially encloses or surrounds the motor as well as at least a portion of the gear train. According to such an embodiment, the motor may be attached to the sub-frame in an isolated configuration. Such a configuration may eliminate the need to provide isolators or bushings between the motor and the housing. The motor may be contained by the sub-frame such that it is not necessary to additionally support the motor on the housing. This last aspect, however, may also be achieved be securely associating the motor with a mid-plate type sub-frame, wherein the motor is completely supported on the sub-frame without the sub-frame at least partially enclosing the motor.

An electronic parking brake actuator including isolation features consistent with the present invention may realize reduced audible noise as compared to an actuator not using isolation features. For example, the audible noise of an actuator consistent with the present invention may be decreased to at least around 19.9 sones during application of the brake and 21.9 sones during the release of the brake, as compared to 30.5 sones and 27.4 sones for a conventional actuator. These observed sound levels were recorded by a microphone positioned 150 mm from the actuator and positioned at a right angle thereto.

While the preceding description has been directed at reducing audible noise or vibration, it should be appreciated that rather than simply reducing or eliminating the audible noise in a vehicle cabin the actuator isolation system herein is actually directed at controlling the audible noise. Controlling the audible noise may include reducing or eliminating the audible noise in the vehicle cabin. Additionally, controlling the audible noise may include transmitting at least a portion of the audible noise from the actuator to the vehicle cabin. For example, in the application as an emergency brake actuator it may be desirable for a vehicle operator to hear the actuator operating, thereby providing an audible indication that the emergency brake is being engaged. Accordingly, the bushings, isolators, and isolation cavity may be selected to pass a desired level or frequency to the vehicle cabin. Similarly, controlling the audible noise from the actuator may include passing certain frequencies of sound, e.g. low frequency sound, to the cabin while eliminating other frequencies.

As discussed above, the use of a sub-frame or mid-plate may improve the manufacturability of an actuator. Consistent with the present invention, an actuator may be manufactured by first greasing and assembling a ring gear of a planetary gear set. A bushing for the motor may then be pressed into the mid-plate and a washer associated with the planetary gear set may be pressed into the ring gear. Next, a motor may be assembled to the mid-plate using a retention strap. With the motor retained to the mid-plate, a drive pulley may be pressed onto the output shaft of the motor. A driven pulley and a drive belt may then be loaded onto the assembly, and the belt may be fully engaged with the drive pulley and the driven pulley.

At this stage, with the components assembled to the mid-plate outside of an actuator housing, electrical terminals may be assembled to a top portion of the mid-plate, for example by ultrasonically welding the terminals to the top portion of the mid-plate. The top portion of the mid-plate may then be joined to the mid-plate and the ring gear and the isolators may be loaded onto the mid-plate and the top portion of the mid-plate. The terminals may then be spot welded to the motor. At this point, operation of the actuator may be tested by providing power to the motor.

The actuator components may next be installed in the actuator housing. The main housing and housing top portion may be perimeter welded. If the main housing and/or the top portion of the housing are formed from glass filled plastic, e.g., glass filled nylon, weld quality may be improved by providing reduced glass content in the top portion of the housing.

Thus, the embodiments that have been described herein are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An electrically actuated parking brake system comprising:
   a vehicle power source;
   an electromechanical actuator comprising a motor having a drive shaft, a drive gear coupled to said drive shaft, a driven gear coupled to said drive gear, said drive gear and said driven gear comprising a worm gear and a worm wheel in meshing engagement, and at least one planetary gear set coupled to said driven gear for driving an actuator output; and
   a brake caliper coupled to said actuator output, said actuator output being configured for driving said brake caliper between an engaged position and a released position.

2. An electrically actuated parking brake system comprising:
   a vehicle power source;
   an electromechanical actuator comprising a motor having a drive shaft, a drive gear coupled to said drive shaft, a driven gear coupled to said drive gear, said drive gear and said driven gear coupled via a drive belt, and at least one planetary gear set coupled to said driven gear for driving an actuator output; and a brake caliper coupled to said actuator output, said actuator output being configured for driving said brake caliper between an engaged position and a released position.

3. An electrically actuated parking brake system comprising:
a vehicle power source;
an electromechanical actuator comprising a motor having a drive shaft, a drive gear coupled to said drive shaft, a driven gear coupled to said drive gear, and at least one planetary gear set coupled to said driven gear for driving an actuator output, said actuator further comprising a component isolator having a spring constant and a damping constant, said isolator coupled between said motor and a remainder of said; and
a brake caliper coupled to said actuator output, said actuator output being configured for driving said brake caliper between an engaged position and a released position.

4. The system according to claim 3, wherein said component isolator comprises a first portion and a second portion, and said first portion is coupled to a first end of said motor and said second portion is coupled to a second end of said motor.

5. An electrically actuated parking brake system comprising:
a vehicle power source;
an electromechanical actuator comprising a motor having a drive shaft, a drive gear coupled to said drive shaft, a driven gear coupled to said drive gear, at least one planetary gear set coupled to said driven gear for driving an actuator output, and a sub-frame, said motor being mounted on said sub-frame, said actuator further comprising a component isolator having a spring constant and a damping constant, said isolator coupled between said motor and said sub-frame; and
a brake caliper coupled to said actuator output, said actuator output being configured for driving said brake caliper between an engaged position and a released position.

6. An electrically actuated parking brake system comprising:
a vehicle power source;
an electromechanical actuator comprising a motor having a drive shaft, a drive gear coupled to said drive shaft, a driven gear coupled to said drive gear, and at least one planetary gear set coupled to said driven gear for driving an actuator output, and a sub-frame, said motor being mounted on said sub-frame and said at least one planetary gear set being mounted on said sub-frame; and
a brake caliper coupled to said actuator output, said actuator output being configured for driving said brake caliper between an engaged position and a released position.

7. The system according to claim 6, further comprising a component isolator having a spring constant and a damping constant, said isolator coupled between said at least one planetary gear set and said sub-frame.

8. An electrically actuated parking brake system comprising:
a vehicle power source;
an electromechanical actuator comprising a motor having a drive shaft, a drive gear coupled to said drive shaft, a driven gear coupled to said drive gear, at least one planetary gear set coupled to said driven gear for driving an actuator output, and a sub-frame, said motor being mounted on said sub-frame, said actuator further comprising a sub-frame isolator having a spring constant and a damping constant, said isolator coupled between said sub-frame and a remainder of said actuator; and
a brake caliper coupled to said actuator output, said actuator output being configured for driving said brake caliper between an engaged position and a released position.

9. An electrically actuated parking brake system comprising:
a vehicle power source;
an electromechanical actuator comprising a motor having a drive shaft, a drive gear coupled to said drive shaft, a driven gear coupled to said drive gear, and at least one planetary gear set coupled to said driven gear for driving an actuator output, and further comprising an actuator housing defining a motor cavity receiving at least a portion of said motor and a covering member disposed adjacent said motor cavity, thereby separating said motor from a remainder of said actuator; and
a brake caliper coupled to said actuator output, said actuator output being configured for driving said brake caliper between an engaged position and a released position.

10. The system according to claim 9, wherein said covering member comprises a sub-frame.

11. An electro-mechanical actuator comprising:
a motor having a drive shaft;
a gear train coupled to said drive shaft for driving an output of said actuator, said gear train comprising a driven gear coupled to a planetary gear set; and
a sub-frame, said motor and at least one of said driven gear and said planetary gear set being mounted on said sub-frame.

12. The electromechanical actuator according to claim 11, further comprising an actuator housing defining a planetary gear set cavity receiving at least a portion of said planetary gear set, wherein cooperation between said housing and said sub-frame separate said planetary gear set from a remainder of said actuator.

13. An electro-mechanical actuator comprising:
a motor having a drive shalt;
a gear train coupled to said drive shaft for driving an output of said actuator;
a sub-frame, said motor and at least a portion of said drive train being mounted on said sub-frame; and
an actuator housing, said housing defining a motor cavity receiving at least a portion of said motor, wherein cooperation between said housing and said sub-frame separate said motor from a remainder of said actuator.

14. The electromechanical actuator according to claim 13, further comprising a first motor isolator having a spring constant and a damping constant, said isolator disposed between said sub-frame and said motor.

15. The electromechanical actuator according to claim 14, further comprising a second motor isolator having a spring constant and a damping constant, said isolator disposed between said motor and said housing.

16. An electro-mechanical actuator comprising:
a motor having a drive shaft;
a gear train coupled to said drive shaft for driving an output of said actuator;

a sub-frame, said motor and at least a portion of said drive train being mounted on said sub-frame; and a sub-frame isolator having a spring constant and a damping constant, said isolator disposed between said sub-frame and an actuator housing.

17. An electrically actuated parking brake system comprising:

a vehicle power source;

an actuator comprising a motor having a drive shaft coupled to a drive pulley, a driven pulley coupled to said drive pulley via a drive belt, and a planetary gear set coupled to said driven pulley for driving an output of said actuator, at least said motor and planetary gear set mounted on a sub-frame, and a component isolator having a spring constant and a damping constant disposed between said sub-frame and an actuator housing; and a brake caliper coupled to said actuator output, said actuator output being configured for driving said brake caliper between an engaged position and a released position.

18. The system according to claim 17, said actuator housing comprising a motor isolation cavity receiving at least a portion of said motor, wherein said sub-frame cooperates with said housing to separate said motor from at least one of said drive gear, driven gear and said planetary gear set.

19. The system according to claim 17, further comprising a motor isolator having a spring constant and a damping constant, said motor isolator disposed between said motor and said mounted plate.

20. A method of assembling an actuator comprising:

mounting a motor and a gear train to a sub-frame;

coupling said sub-frame to a portion of an actuator housing to at least partially enclose said motor in a motor isolation cavity defined by said portion of said actuator housing and said sub-frame.

21. A method according to claim 20, said method further comprising:

coupling a second sub-frame to said sub-frame to enclose at least a portion of said gear train in a cavity defined by said sub-frame and said second sub-frame.

22. A method according to claim 21, said method further comprising:

coupling a second portion of said actuator housing to said portion of said actuator housing to enclose said sub-frame and said second sub-frame at least partially within said actuator housing.

23. A method according to claim 20, said method further comprising:

providing at least one motor isolation bushing between said portion of said actuator housing and said motor.

24. A method according to claim 20, said method further comprising:

providing a first motor isolation bushing between said portion of said actuator housing and said motor; and providing a second motor isolation bushing between said sub-frame and said motor.

25. A method according to claim 20, said method further comprising:

providing at least one isolation bushing between said portion of said actuator housing and said sub-frame.

* * * * *